US006580968B1

(12) United States Patent
Yuyama et al.

(10) Patent No.: US 6,580,968 B1
(45) Date of Patent: Jun. 17, 2003

(54) CONTROL APPARATUS FOR DISPENSING MACHINES

(75) Inventors: Hiroyuki Yuyama, Toyonaka (JP); Keita Yasuoka, Toyonaka (JP); Eiichi Fukumoto, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/716,436

(22) Filed: Nov. 21, 2000

(30) Foreign Application Priority Data

Nov. 22, 1999 (JP) .......................................... 11-331199

(51) Int. Cl.[7] ............................................... G06F 17/00
(52) U.S. Cl. ....................................... 700/241; 700/244
(58) Field of Search ................................ 700/231, 236, 700/241, 244, 216

(56) References Cited

U.S. PATENT DOCUMENTS

| | | | | |
|---|---|---|---|---|
| 5,208,762 A | * | 5/1993 | Charhut et al. | 221/9 |
| 5,271,703 A | * | 12/1993 | Lindqvist et al. | |
| 5,502,944 A | * | 4/1996 | Kraft et al. | |
| 5,597,995 A | * | 1/1997 | Williams et al. | 235/375 |
| 5,720,154 A | * | 2/1998 | Lasher et al. | 53/168 |
| 5,761,877 A | * | 6/1998 | Quandt | 221/124 |
| 5,771,657 A | * | 6/1998 | Lasher et al. | 53/131.4 |
| 5,852,911 A | * | 12/1998 | Yuyama et al. | 221/10 |
| 5,907,493 A | * | 5/1999 | Boyer et al. | 700/213 |
| 5,930,145 A | * | 7/1999 | Yuyama et al. | 235/375 |
| 6,170,230 B1 | * | 1/2001 | Chudy et al. | 53/168 |
| 6,181,982 B1 | * | 1/2001 | Yuyama et al. | 221/2 |
| 6,212,853 B1 | * | 4/2001 | Yuyama et al. | 53/55 |
| 6,226,564 B1 | * | 5/2001 | Stuart | 221/2 |
| 6,256,967 B1 | * | 7/2001 | Hebron et al. | 53/131.3 |
| 6,308,109 B1 | * | 10/2001 | Yuyama et al. | |

FOREIGN PATENT DOCUMENTS

| | | |
|---|---|---|
| JP | 64-9201 | 2/1989 |
| JP | 3-59 | 1/1991 |
| JP | 4-57348 | 9/1992 |
| JP | 6-312010 | 11/1994 |

* cited by examiner

*Primary Examiner*—Khoi H. Tran
(74) *Attorney, Agent, or Firm*—Wenderoth, Lind & Ponack, L.L.P.

(57) ABSTRACT

The present invention provides a control apparatus for use in dispensing machines which can easily set up a plural kinds or a plural numbers of dispensing machines in the same manner. To do this end, the control apparatus for dispensing machines operates and controls a plural kinds or a plural numbers of dispensing machines in accordance with a prescription data. Use conditions of each dispensing machines are stored in an use condition setting file. A dispensing machine to be used for dispensing is selected in accordance with both the prescription data and the use condition setting file.

9 Claims, 10 Drawing Sheets

*Fig.2*

USE CONDITION SETTING FILE>

| MACHINE KIND | MACHINE NUMBER | UNUSABLE FLAG | EXCLUSIVE PRESCRIPTION CLASSIFICATION | LIMITATION / TIME ZONE |
|---|---|---|---|---|
| 1 ( TABLET PACKING MACHINE ) | 1 | 0 ( USABLE ) | 2 ( EXCLUSIVE TO OUTPATIENT ) | ☑ EFFECTIVE 08:00~13:00 |
| 1 ( TABLET PACKING MACHINE ) | 2 | 0 ( USABLE ) | 0 ( UNDESIGNATED ) | ☐ EFFECTIVE |
| ⋮ | ⋮ | ⋮ | ⋮ | ⋮ |
| 1 ( TABLET PACKING MACHINE ) | M | 0 ( USABLE ) | 0 ( UNDESIGNATED ) | ☐ EFFECTIVE |
| 2 ( MEDICINE BAG PRINTING MACHINE ) | 1 | 0 ( USABLE ) | 2 ( EXCLUSIVE TO OUTPATIENT ) | ☐ EFFECTIVE |
| 2 ( MEDICINE BAG PRINTING MACHINE ) | 2 | 0 ( USABLE ) | 0 ( UNDESIGNATED ) | ☐ EFFECTIVE |
| ⋮ | ⋮ | ⋮ | ⋮ | ⋮ |
| 2 ( MEDICINE BAG PRINTING MACHINE ) | L | 0 ( USABLE ) | 0 ( UNDESIGNATED ) | ☐ EFFECTIVE |
| N (X X X X X) | 1 | 0 ( USABLE ) | 0 ( UNDESIGNATED ) | ☐ EFFECTIVE |
| ⋮ | ⋮ | ⋮ | ⋮ | ⋮ |

*Fig.3*

SERIOUS ERROR NUMBER SETTING FILE>

| MACHINE KIND | SERIOUS ERROR NUMBER | SERIOUS ERROR SITUATION | COUNTER MEASURE TO ERROR |
|---|---|---|---|
| 1 ( TABLET PACKING MACHINE ) | 31 | PACKING MECHANISM PORTION / OPERATION ABNORMAL | ELIMINATE CAUSE OF PAPER JAM ETC. AND RESET |
| 1 ( TABLET PACKING MACHINE ) | 32 | HEAT SEAL TEMP. ABNORMAL | POWER OFF AND ON AGAIN |
| .... | .... | .... | 1 |
| 2 ( MEDICINE BAG PRINTING MACHINE ) | 51 | PRINTER OPERATION ABNORMAL | POWER OFF AND ON AGAIN |
| 2 ( MEDICINE BAG PRINTING MACHINE ) | 52 | BAG MAKING HEATER TEMP. ABNORMAL | POWER OFF AND ON AGAIN |
| .... | .... | .... | .... |
| | | | |

*Fig.4*

<SERIOUS ERROR RECORDING FILE>

| DATE OF OCCURRENCE | MACHINE KIND | MACHINE NUMBER | SERIOUS ERROR NUMBER |
|---|---|---|---|
| ⋮ | ⋮ | ⋮ | ⋮ |
| 1999. 07. 09 11:23 | 2 (MEDICINE BAG PRINTING MACHINE) | 2 | 51 |
| 1999. 07. 12 09:05 | 1 (TABLET PACKING MACHINE) | 1 | 31 |
| | | | |

CONTROL APPARATUS FOR DISPENSING MACHINES

BACKGROUND OF THE INVENTION

The present invention relates to a control apparatus for use in dispensing machines which controls all kinds of dispensing machines for dispensing work, such as medicine packing machines and medicine bag printing machines used in medical agency such as hospital, pharmacy and so on, in accordance with prescription data.

Conventionally, in a control apparatus for operating a medicine packing machine which distributes and packs medicines having forms of tablets and powder into a packing paper bag in accordance with inputted prescription data, the control apparatus controls a plurality of medicine packing machines and also controls a plurality of medicine bag printing machines each of which prints patient name and dosing method on a medicine bag in which medicines are to be contained.

For example, Japanese patent publication of examined application S64-9201 discloses a medicine packing apparatus which can operate a plurality of medicine packing machines with one control panel by using a data table about medicines.

Japanese patent publication of examined application H3-59 discloses a tablet packing apparatus which concentrically controls a number of medicine packing machines with one controller by transmitting prescription data to a medicine packing machine which is in a non-operating condition.

Japanese patent publication examined application H4-57348 discloses a dispensing control apparatus in which data from a host computer is assigned to an input device of a dispensing machine adapted to the kind of dispensation.

Japanese patent publication of unexamined application H6-312010 discloses a dispensing system control apparatus which, in the case of using a plurality of tablet packing machines, reduces an additional manual supply of medicine and averages operations of machines to contemplate shortening of dispensing time.

However, in any control apparatuses described above, it is necessary to make the control method different in every kind of dispensing machine. Since the kinds and numbers of the dispensing machines are different in every medical institute, it is necessary to design and fabricate the dispensing machines of different specifications in every medical institute. In addition, equipment and monitoring methods are different in every kind of dispensing machine, resulting in complication of operation when using the dispensing machines. Particularly, in the medicine packing machines and the medicine bag printing machines, although it is desired to exclusively use each machine by classifying them into inpatient/outpatient, the aforementioned control apparatuses have provided no solution to this.

In any of the control apparatuses described above, a countermeasure in the case of shutdown of the dispensing machine due to an error is not sufficient. For example, the dispensing control apparatus disclosed in Japanese patent publication of examined application H4-57348 can only output such a kind of dispensing data, as a dispensing direction, that can not be dispensed. Therefore, in a busy dispensary, there has been a disadvantage that no one becomes aware of stagnancy of work (packing work of tablets and capsules, forming work of medicine bags and so on). The larger the kinds and the number of the dispensing machines become, the more the above advantage becomes remarkable. Therefore, it has been desired to intensively monitor the use, e.g., operation status, situation of the dispensing machines and, if it seems to take a long time to recover from the shutdown due to the error, make it impossible to use the dispensing machine concerned in order to eliminate the stagnancy of work. It has been also desired to make it possible to obtain information regarding the situation of occurrence of errors in order to explore the cause of the error.

SUMMARY OF THE INVENTION

Therefore, it is a first object of the present invention to provide a control apparatus for use in dispensing machines which can easily set up plural kinds or plural numbers of dispensing machines in the same manner.

It is a second object of the present invention to provide a control apparatus for use in dispensing machines which can unitarily control and accurately grasp situation of occurrence of errors in dispensing machines.

As a means to accomplish the first object, the present invention provides a control apparatus for dispensing machines which operates and controls a plural kinds or a plural numbers of dispensing machines in accordance with a prescription data. The control apparatus of a first embodiment comprises:

a hard disc unit for storing an use condition setting file comprising use condition of each dispensing machines; and a central processing unit for selecting an usable dispensing machine in accordance with both the prescription data and the use condition of each dispensing machines stored in the use condition setting file.

According to this construction of the present invention, when the prescription data is inputted, the usable dispensing machine can be automatically selected in accordance with the use condition setting file. Since data concerning to the use condition of each dispensing machine is stored, all dispensing machines can be unitarily controlled. Thus, the control apparatuses need not be designed and fabricated in different specifications in each medical institute. In addition, even in the case of extending the dispensing machine, the control apparatus need not be altered and operation of dispensing machine is also simplified.

Preferably, the use condition setting file stored in the hard disc unit includes a prescription classification showing any one of a prescription to outpatient, a prescription to inpatient and an undesignated prescription. Whereby, each machine number of the plurality of dispensing machines can be exclusively used to inpatient/outpatient prescriptions, enabling to enhance efficiency of all dispensing works.

Preferably, the central processing unit displays the use situation of each dispensing machine on a monitor screen, enabling early finding of the error and preventing stagnancy of work.

Preferably, the central processing unit, when judging that there is no usable dispensing machine in accordance with the prescription data and the use condition setting file, temporarily stores the prescription data and displays the error situation on the monitor screen, thereby more effectively preventing the stagnancy of dispensing work.

As a means to solve the second problem, the present invention provides the above control apparatus, wherein the hard disc unit stores a serious error setting file comprising serious errors among errors which occur in the dispensing machines, the serious errors being possible to arbitrarily set, and wherein the central processing unit judges whether an error signal inputted from any of the dispensing machines corresponds to the serious error in the serious error setting file.

According to this construction of the present invention, the serious errors can be arbitrarily set in every dispensing machines and can be unitarily controlled in accordance with the serious error setting file.

Preferably, if an error signal inputted from any of the dispensing machines corresponds to the serious error in the serious error setting file, the central processing unit displays the situation of the serious error on the monitor screen. Whereby, an operator can easily obtain information regarding the situation of errors and properly promptly take a countermeasure to the errors such as making the corresponding dispensing machine unusable and so on.

Preferably, if an error signal inputted from any of the dispensing machines corresponds to the serious error in the serious error setting file, the central processing unit displays the countermeasure of the serious error on the monitor screen. Whereby, the countermeasure can be grasped at a glance and the error can be properly promptly restored without checking an operation manual.

Preferably, if an error signal inputted from any of the dispensing machines corresponds to the serious error in the serious error setting file, the central processing unit sets the dispensing machine that is unusable and stops assigning the prescription data to that dispensing machine, thereby automatically preventing the stagnancy of dispensing work.

Preferably, if an error signal inputted from any of the dispensing machines corresponds to the serious error in the serious error setting file, the central processing unit records the situation of the serious error in a serious error recording file, thereby easily enabling an understanding of the cause of the error.

BRIEF DESCRIPTION OF THE DRAWINGS

Further objects and advantages of the present invention will become clear from the following description taken in conjunction with the preferred embodiments thereof with reference to to accompanying drawings, in which:

FIG. 2 is a table showing memory contents of an use condition setting file;

FIG. 3 is a table showing memory contents of a serious error setting file;

FIG. 4 is a table showing memory contents of a serious error recording file;

DETAILED DESCRIPTION OF THE PREFERRED EMBODIMENTS

Figure 1:
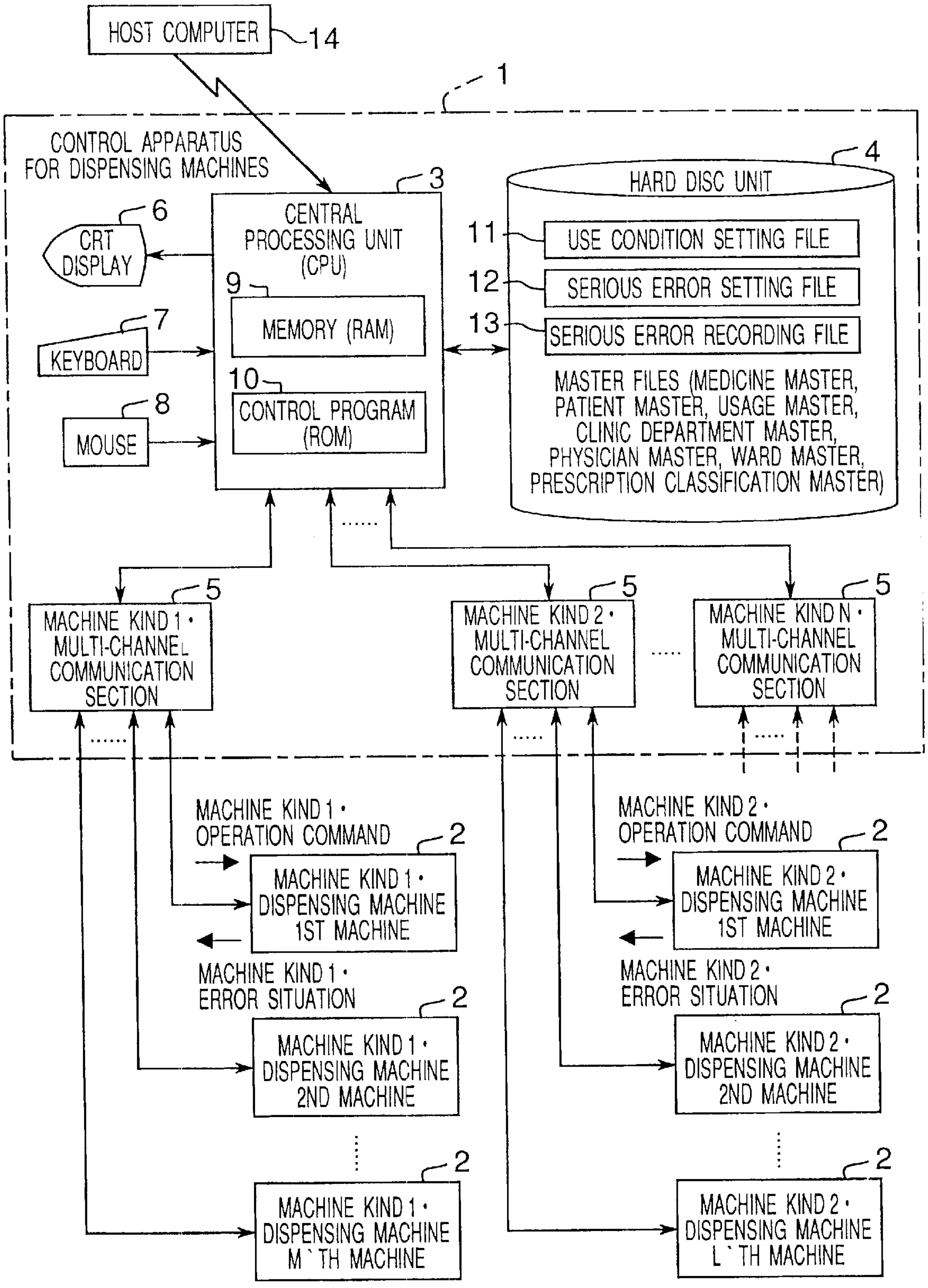
FIG. 1 is a block diagram showing a device construction of a control apparatus for dispensing machines.

FIG. 1 shows a control apparatus 1 for dispensing machines and a plurality of dispensing machines 2 operated and controlled by the control apparatus 1.

The dispensing machine control apparatus 1 is provided with a central processing unit (CPU) 3, a hard disc unit 4, multi-channel communication sections 5, a CRT display 6, a keyboard 7 and a mouse 8.

The central processing unit (CPU) 3 contains a memory 9 (RAM) for storing all kinds of data and a control program 10 (ROM) for controlling the whole control apparatus. The memory 9 (RAM) is used as a prescription data memory for storing prescription data and other memories (necessary working areas, variables and so on to processing the program).

The hard disc 4 includes a use condition setting file 11 for setting use conditions of each kind of machine and each machine number, a serious error setting file 12 for setting serious errors of each kind of machine, a serious error recording file 13 for recording occurrences of serious errors, all kind of master files for storing related information when inputting prescription data and so on. As the hard disc apparatus 4, a rewritable nonvolatile memory such as a flash memory and so on can be used.

The use condition setting file 11 is a data file for storing use conditions of the plural kinds and the plural numbers of dispensing machines 2, i.e., all kinds of data such as unusable machine flag data, exclusive prescription classification data and so on in each machine kind and each machine number. The stored content of the use condition setting file 11 is as shown in FIG. 2.

In FIG. 2, the machine kind means an ID number of the kind of each dispensing machine 2. For example, if the machine kind is a "tablet packing machine", "1" is inputted. If the machine kind is a "medicine bag printing machine", "2" is inputted. When a new machine kind is added, an ID number of the kind of the machine may be added. The machine number means a number of each machine in each kind of dispensing machine 2. When the machines are increased, the machine number may be increased. Into the unusable flag, "0" is inputted if the machine is "usable", while "1" is inputted if the machine is "unusable". The exclusive prescription classification means a classification of prescription exclusively assigned to each machine. For example, "0" is inputted if an "undesignated" description (all descriptions) is assigned to the machine, "1" is inputted if an "exclusive prescription to inpatient" is assigned to the machine, and "2" is inputted if an "exclusive prescription to outpatient" is assigned to the machine. The prescription classification is not limited to the prescriptions exclusive to inpatient/outpatient but the prescription to inpatient may be classified in more detail, for example, to a prescription to fixed-period admission patient, a prescription to temporal admission patient, a prescription to discharged patient and so on. The limitation/time zone means a time zone for which the exclusive use of the machine classified by the exclusive prescription classification is effective. When specifying the limitation/time zone, the check box (□ marked) of "effective" is ON (click with the mouse to mark √) and a time zone to be limited is inputted.

Specifically, in the 1st machine within the tablet packing machines, as the use condition of the "limitation/time zone" is effective, the machine is exclusive to outpatient within only the time zone of "8:00–13:00" (exclusive prescription to outpatient). As the other time is without the range of the "limitation/time zone", the exclusive prescription is undesignated (namely prescription of inpatient is allowable). On the other hand, in the 1st machine in the medicine bag printing machines, as the use condition of the "limitation/time zone" is not effective, the machine is always exclusive to outpatient for 24 hours.

If the limitation is not effective, it means "always, 24 hours". The contents of memory correspond to the device construction shown in FIG. 1. M of the "tablet packing machines" of the machine kind 1 are connected, L of the "medicine bag packing machines" of the machine kind 2 are connected and followed by other kind N. The data of the use condition setting file 11 (FIG. 2) is inputted on a screen (illustration thereof is omitted because the screen is same as the construction of the use condition setting file of FIG. 2) for registration of use condition setting, which screen is started from a menu screen (illustration thereof is omitted because the screen has only start buttons).

Figure 7:
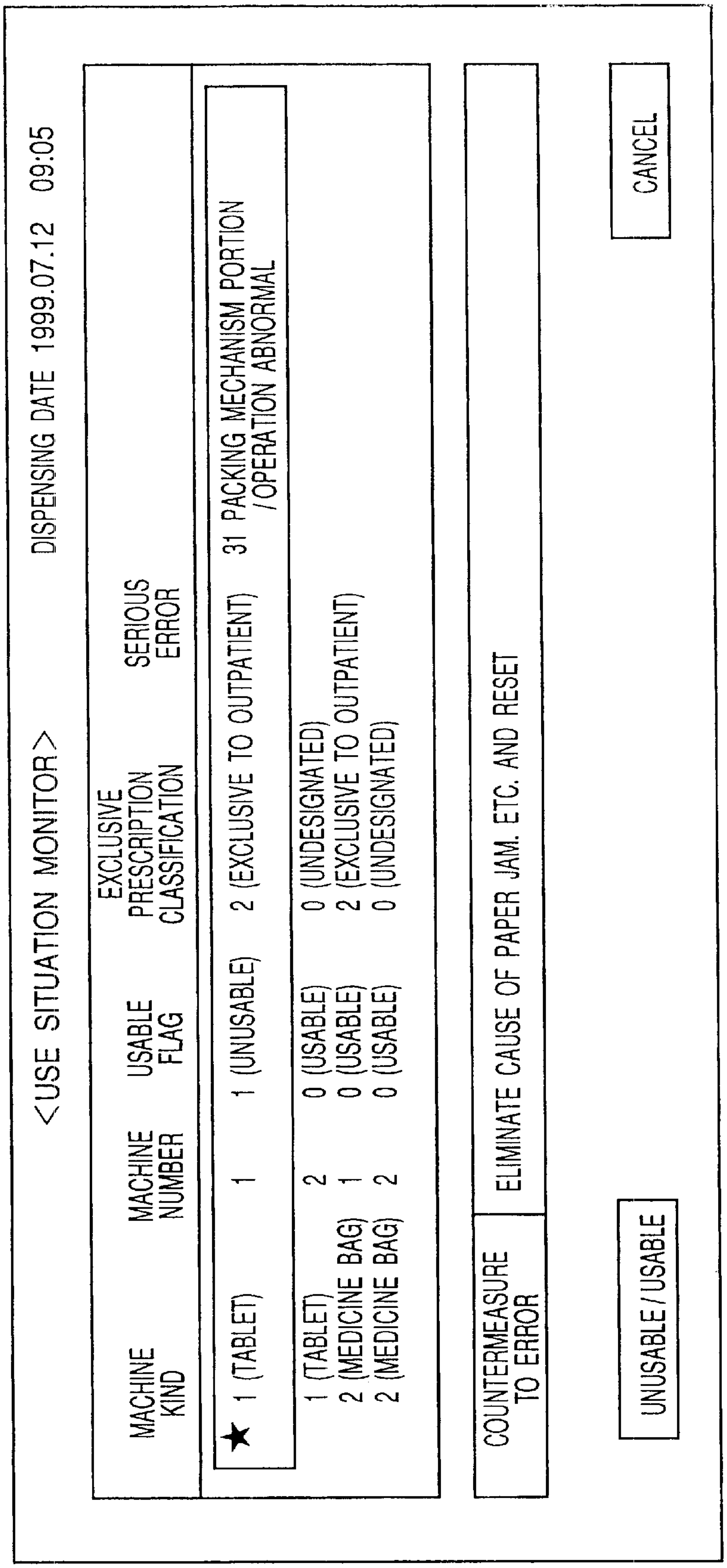
FIG. 7 is a diagram showing a screen for use situation monitor.

The serious error setting file 12 is a data file for voluntary storing serious errors which are different in every kinds of the dispensing machines 2. The stored contents of the serious error setting file 12 are as shown in FIG. 3. In FIG. 3, the machine kind means an ID number of the kind of each dispensing machine 2. If the machine kind is a "tablet packing machine", "1" is inputted, while if the machine kind is a "medicine bag printing machine", "2" is inputted. The serious error number means a number of serious error which is different in every kind of machine. Only the error numbers which are considered to be serious among the error numbers received from the dispensing machines 2 are inputted. The serious error situation is inputted with arbitrary character string showing the situation of the serious error. The countermeasure to error is inputted with arbitrary character string showing the countermeasure method to the serious error. Both the serious error situation and the countermeasure to error are displayed on a screen of "use situation monitor" (FIG. 7). The data of the serious error setting file 12 (FIG. 3) is inputted on a screen (illustration thereof is omitted because the screen is same as the construction of the serious error setting file 12 of FIG. 3) for registration of serious error setting, which screen is started from a menu screen (illustration thereof is omitted).

The serious error recording file 13 is a data file for recording situations of occurrences of serious errors. The data of the serious error recording file 13 comprises serious error numbers which are recorded for every date of occurrence, machine kind and machine number. The contents of the serious error recording file 13 can be confirmed by a maintenance service man who converts them to a CSV (comma-delimited) format file and displays them in a list table format with a spreadsheet program.

All kind of master files includes a medicine master, a patient master, an usage master, a clinic department master, a doctor master, a ward master, a prescription classification master and so on. The illustrations of the masters are omitted because they are only files of simple constructions for storing codes, names and so on.

The multi-channel communication sections 5 are used to the communication with each machine number of the dispensing machines 2. The CRT display 6, the keyboard 7 and the mouse 8 are used for the input of prescription data and the data input of the all kinds of files.

The dispensing machines 2 include mainly medicine packing machines and medicine bag printing machines and also include a dispensed powder checkup machine for the checkup of the dispensed powder, a dispensed potus checkup machine for the checkup of the dispensed potus, a potus packing machine and so on. More than one machine kind and more than one machine number of machines are connected to the control apparatus 1. An ID number of machine kind is assigned to each kind of dispensing machine 2 while a machine number is also assigned to each dispensing machine 2 in order to use them for identification and control of the machines. When a new machine kind is added, an ID number of the kind of the machine may be added. When the machines are increased, the machine number may be increased. The control apparatus I and the dispensing machines 2 are connected via high speed serial communication. However, any connection and communication methods such as all-purpose bus connection and network (LAN) connection can be used.

Numeral 14 denotes a host computer which is used to receive prescription data from an external system. However, as the prescription data can be newly inputted with only the CRT display 6, the keyboard 7 and the mouse 8, the host computer 14 is not always necessary.

The central processing unit 3 (CPU), the CRT display 6, the keyboard 7, the mouse 8 and the hard disc unit 4 may be constituted by a personal computer. There may be also allowable a client-server construction in which the hard disc unit 4 is an independent file server apparatus (CPU built-in) and the central processing unit 3 (CPU) is, as a client terminal, connected to the server apparatus through the network (LAN). As to the communication between each machine number of the dispensing machines 2, in stead of the multi-channel communication sections 5, all dispensing machines 2 including each machine numbers may be connected to the same network (LAN) to communicate with each other.

Figure 5:
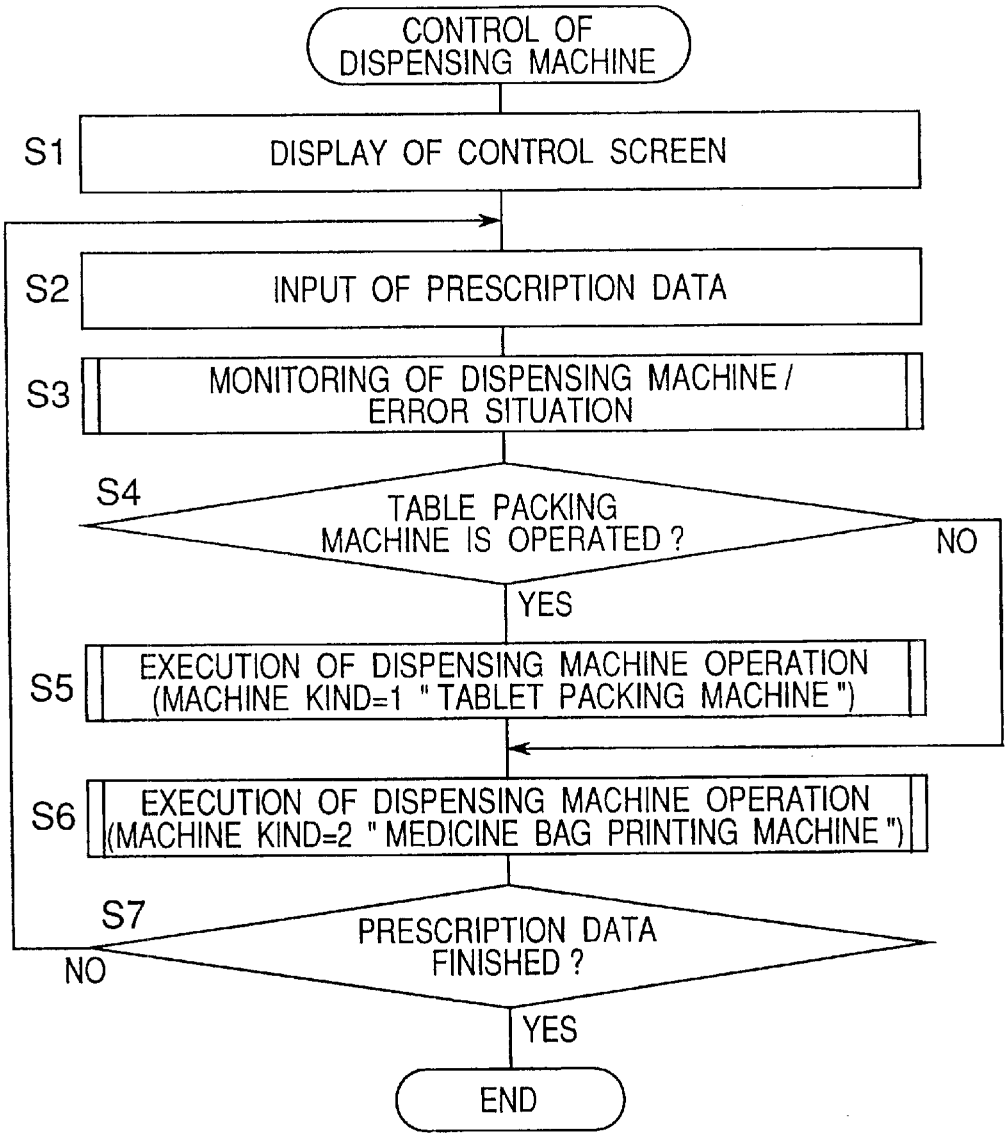
FIG. 5 is a flow chart showing a control process of dispensing machines.

Next, operation in a case that the tablet packing machine and the medicine bag printing machine are driven and controlled by the control apparatus 1 will be explained in accordance with the flowchart as shown in FIG. 5.

Figure 6:
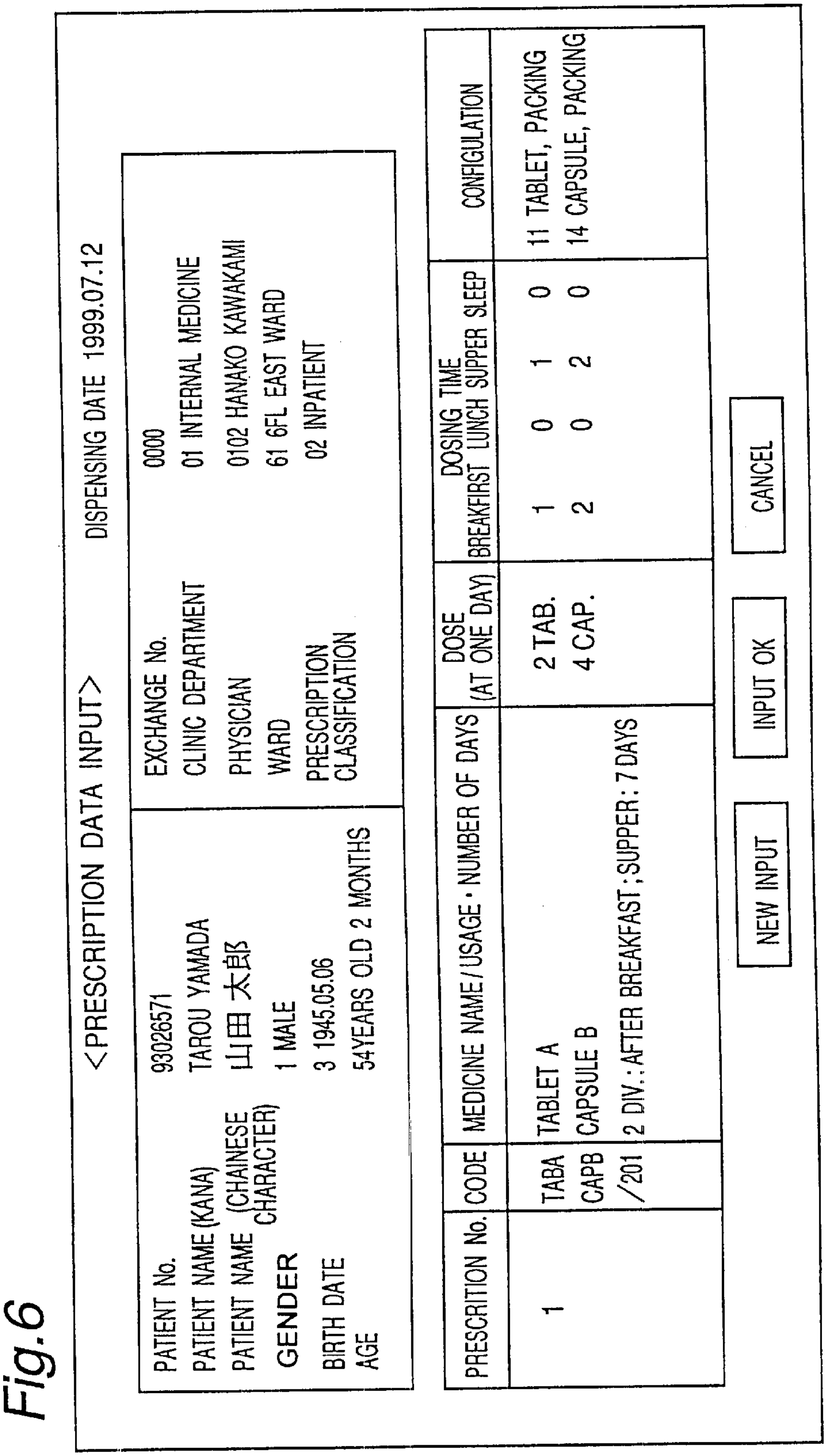
FIG. 6 is a diagram showing a screen for prescription data input.

First, control screens started from a menu screen (illustration thereof are omitted because the screen has only start buttons) are displayed on the CRT display 6 (step S1). The control screens means both a screen of "prescription data input" as shown in FIG. 6 and a screen of "use situation monitor" as shown in FIG. 7 which are displayed in the separate windows. A CRT display 6 dedicated to monitor the dispensing machines 2 may be separately provided so that the screen of use situation monitor is displayed on the CRT display 6.

Then, the screen of "prescription data input" (FIG. 6) is displayed as an operating object. As the screen of "prescription data input" is in an initial state with the data input columns being blank, a prescription data is inputted (step S2). The input of the prescription data is conducted with the data reception from the host computer or the data input by the keyboard 7 and the mouse 8. In the dispensing date, today's date by a built-in calendar clock in the central processing unit 3 (CPU) is displayed. In the other blank columns, the contents of the prescription data received from the host computer 14 are displayed. The received data from the host computer 14 is comprised of only all kinds of codes because of reducing the data quantity of the communication. Therefore, when displaying the contents of the prescription data, a process for reading the name data and so on from the all kinds of master files with the search key of all kinds of codes is conducted. For example, as the medicine of "tablet A" is stored only as "TABA" in the received data, the name of the medicine is read from the medicine master file. The medicine code is a code having single meaning in every medicines such as an abbreviation of medicine (for example, the code of "tablet A" is "TABA"). A pharmacist checkups the contents of the displayed prescription data and if there is no problem, she/he clicks the button of "INPUT OK" with mouse 8. The content of the prescription data can be arbitrarily changed with the keyboard 7 and the mouse 8.

In the screen of "prescription data input", the exchange number is a number of "medicine exchange sheet" which is passed in advance to a patient who finished account. In the present example of the prescription data (FIG. 6), as the prescription classification is "02 inpatient" (admission), the exchange number has no meaning and therefore is displayed as "0000". As to clinic department, physician, ward and prescription classification, when inputting their codes, the name data is read from the corresponding master files and displayed. (For example, when inputting "01" with respect to the clinic department, "internal medicine" is displayed.) The column of "prescription No." is a continuous number comprising a set of medicine (a plural medicine is possible) and usage. A plurality of the "prescriptions" can be inputted. The input column of "code" is a column for inputting the medicine code or usage code. When inputting the code, the name data is read from the medicine master file or the usage master file and displayed. In the input column of "code", normally the medicine code (for example, "TABA") is inputted. However, if the mark of "/" is inputted first, then the usage code (for example, "201") is inputted, whereby the usage (Division Number 2, after breakfast and supper) corresponding to the usage code "201" is displayed. On the line with the usage code inputted, the input column of "Number of days" is displayed after displaying the usage, whereby the number of days (for example, "7 days") can be inputted. The column of "dose" is a column for inputting a dose at one day. The units (tablet, capsule, g, ml and so on) are read from the medicine master file and displayed. The column of "dosing time" is a column for inputting one dosage obtained by dividing the dose at one day by the dosing time. The unit of dose is number (tablet number) in the case of tablets, capsules and pills, while gram in the case of powder. The configuration code of the column of "configuration" is read from the medicine master file and displayed. The configuration code is a code used for classifying the medicine by the configuration thereof in the dispensing work. "Packing" means packing the medicine automatically fed from the medicine feeder, while "heat seal" means delivering the medicine with the heat-sealed package packed at a pharmaceutical maker. Exemplary configuration codes 11 for "tablet with packing", 13 for "tablet with heat seal", 14 for "capsule with packing", 16 for "capsule with heat seal", 17 for "powder with packing", 19 for "powder with heat seal" and so on are inputted. When the button of "NEW INPUT" is clicked, the display is stored and then cleared in order to latterly process the prescription data displayed at that time, whereby any prescription data can be newly inputted starting from the patient number. In this case, for example, when inputting the patient number of "93026571" with the keyboard, patient name (KANA, Chinese character), gender and birth date are read from the patient master file and displayed. Age of the patient is automatically calculated based on the birth date and today's date and displayed. When the button of "INPUT OK" is operated, the process of "monitoring of dispensing machine/error situation" is conducted (step S3).

Figure 8:
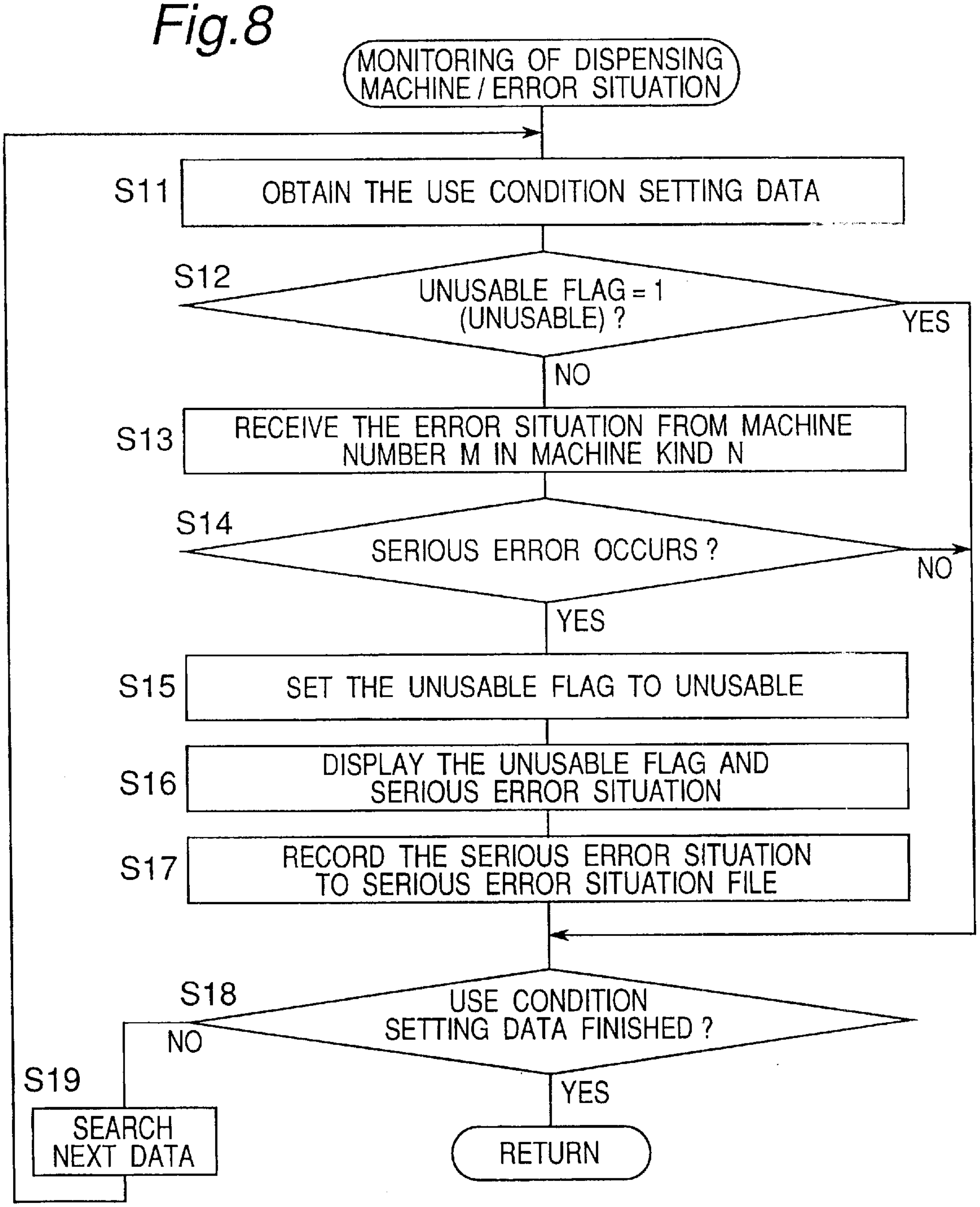
FIG. 8 is a flow chart showing a process of monitoring of dispensing machines/error situation.

In the process of monitoring of dispensing machine/error situation, as shown in the flow chart of FIG. 8, the use condition setting data (line record) is obtained from the use condition setting file 11 (FIG. 2) (step S11).

Then, it is judged whether the unusable flag is 1 (unusable) (step S12). If the unusable flag of the use condition setting data is "unusable", the machine number M in the machine kind N is unusable, whereby the step is shifted to the judge whether the setting of the data is finished (step S18). On the other hand, if the unusable flag of the use condition setting data is "usable", the error situation signal (error number) is received from the machine number M in the machine kind N set in the use condition setting data (step S13).

Consequently, it is judged whether the serious error occurs (step S14). Namely, the data of machine kind N in the serious error setting file (FIG. 3) is searched to judge whether the received error number is set as the serious error number. If it is not set as the serious error number, it is a normal error, whereby the step is shifted to the judge whether the setting of the data is finished (step S18).

On the other hand, if the received error number is set as the serious error number, the unusable flag of the use condition setting data in the use condition setting file 11 (FIG. 2) is set to "unusable" (step S15). Then, as shown in FIG. 7, "unusable" is displayed in the column of "unusable flag" on the screen of "use situation monitor" and also the serious error number and the serious error situation are displayed in the column of "serious error" (step S16).

In the columns of "machine kind", "machine number" and "unusable flag" on the screen of "use situation monitor", the content of the use condition setting file 11 (FIG. 2) is displayed as it is. In the next column of "exclusive prescription classification", the situation at the present time is displayed on the basis of the content of the use condition setting file 11 (FIG. 2). For example, in the case of the machine number 1 of the tablet packing machine in FIG. 7, as the present time is "09:05" that is within the range of "limitation/time zone", "2(exclusive to outpatient)" is displayed as the present situation in the column of "limitation/time zone". When it is without the range of "limitation/time zone", "0(undesignated)" is displayed. In the column of "serious error", the number and situation of occurrence of error are displayed on the basis of the content of serious error setting file (FIG. 3). The mark of "★" and the reverse video display line show line and data of an object to be processed and can be arbitrarily moved with the up and down keys and the click of mouse 8. In the column of "countermeasure to error", in the case that the serious error is included in the line data, the countermeasure to the serious error is displayed. The contents of the countermeasure to the serious error are set in the serious error setting file (FIG. 3). The button of "unusable/usable" is a button for alternately changing the content of the unusable flag in the line data to "1=unusable" or "0=usable" with the button clicked in order to arbitrarily set or reset the unusable flag. The button of "CANCEL" is to erase the window.

The situation of occurrence of serious error is recorded in the serious error recording file 13 (FIG. 4) (step S17). The contents of the record can be confirmed by the maintenance service man who properly understands the operation situation of the dispensing machines 2*a* to take a proper countermeasure.

After that, it is judged whether the use condition setting data obtained from the use condition setting file 11 (FIG. 2) is finished (step S18). If finished, the step is returned to Step S4. If it is not finished, the next use condition setting data is searched (step S19) and the step is returned to Step S11 to repeat the steps from the acquisition of the data.

When the process of the "monitoring of dispensing machine/error situation" is finished, the step is returned to Step S4 in FIG. 5 to judge whether the tablet packing machine may be operated. This is conducted by judging on the basis of the configuration code of the medicine whether the "tablet" or "capsule" to be automatically packed by the tablet packing machine exists in the medicine of the prescription data.

If the corresponding configuration code of the medicine exists, it is judged that the tablet packing machine should be operated, whereby the operation of the dispensing machine (machine kind=1, "tablet packing machine") is conducted (step S5). In detail, by setting "1" in the machine kind, the procedure of "execution of dispensing machine operation" is called and executed.

Figure 9:
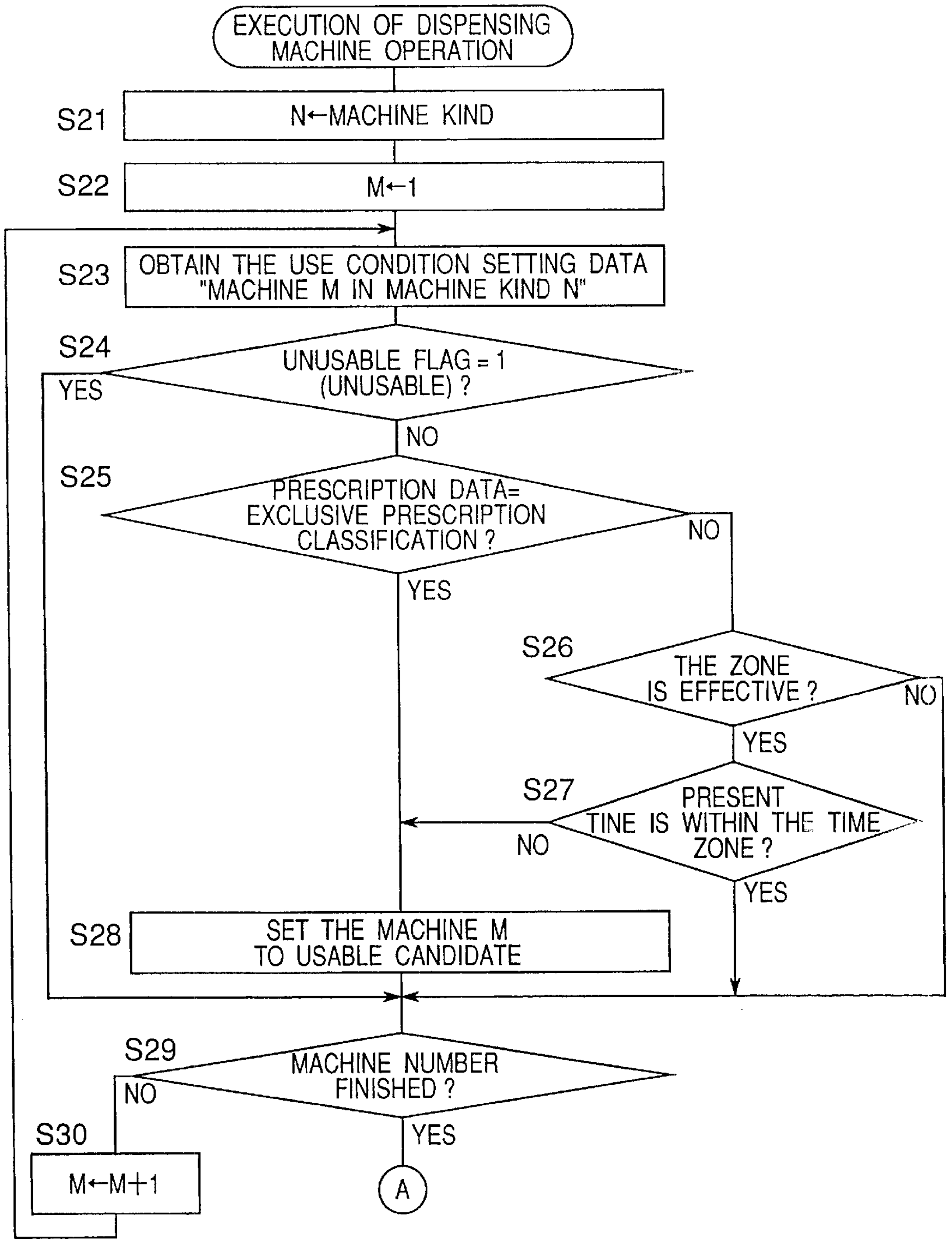
FIG. 9 is a flow chart showing a process of execution of dispensing machine operation.
Figure 10:
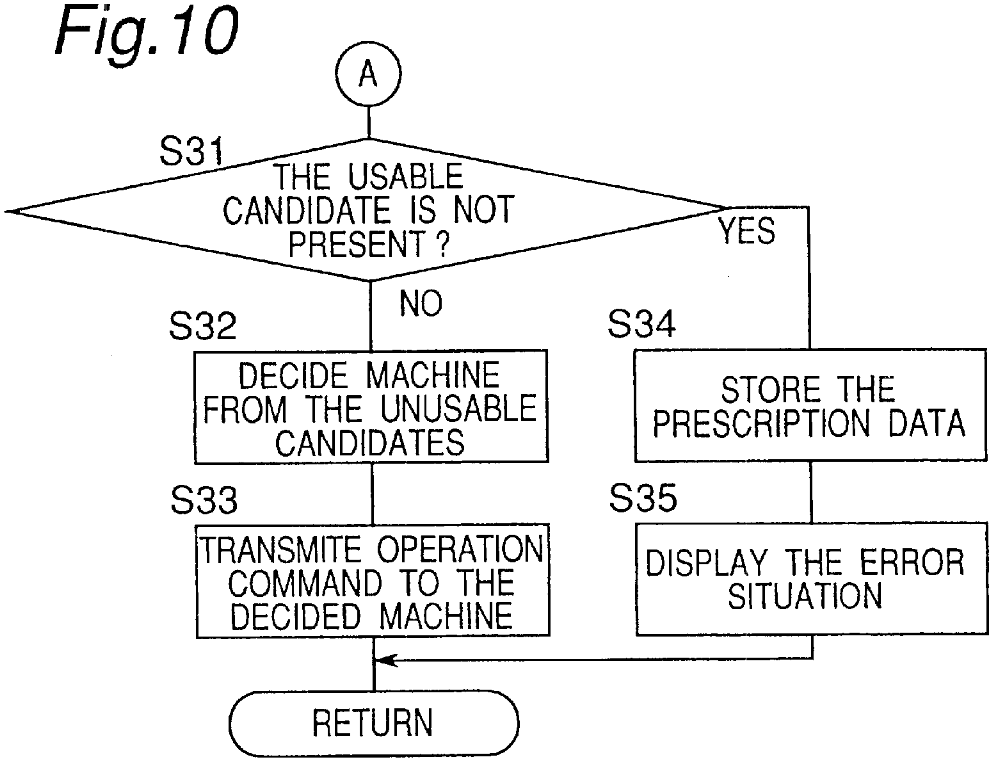
FIG. 10 is a flow chart showing a process of execution of dispensing machine operation.

In the process of "execution of dispensing machine operation", as shown in the flow charts of FIGS. 9 and 10, the machine kind is set in the variable N (machine kind) (step S21) and "1" is initially set in the variable M (machine number) (step S22). Then, the use condition setting data (line record) of "machine number M in machine kind N" is obtained from the use condition setting file 11 (FIG. 2) (step S23).

Wherein, it is judged whether the unusable flag is 1 (unusable) (step S24). If the unusable flag of the use condition setting data is "unusable", the machine number M in the machine kind N is unusable, whereby the step is shifted to determine whether the machine number is finished (step S29). On the other hand, if the unusable flag of the use condition setting data is "usable", it is judged whether the "prescription classification" of the prescription data (FIG. 6) coincides with the "exclusive prescription classification" of the use condition setting data (step S25). If the "exclusive prescription classification" is "undesignated" (all prescription), it is judged as coincidence.

If the "prescription classification" coincides with the "exclusive prescription classification" of the use condition setting data, the machine number M is set as an usable candidate at step S28 and it is determined whether the machine number is finished (step S29). However, the final decision of machine number is conducted at the subsequent process step (step S32). On the other hand, the "prescription classification" does not coincide with the "exclusive prescription classification" of the use condition setting data, it is judged whether the time zone is effective (step S26). If the check box (marked □) of "effective" in the "limitation/time zone" in the use condition setting data is ON (marked √), then the time zone judged as effective, while if OFF (not marked √), then the time zone judged as ineffective.

If the time zone is effective, it is judged whether the present time is within the time zone (step S27). This judgement is conducted by whether the present time by a built-in calendar clock in the central processing unit 3 (CPU) is within the "limitation/time zone" of the use condition setting data. If the present time is within the time zone, the step is sifted to determine whether the machine number is finished (step S29). If it is not within the time zone, the machine number M is set as an usable candidate at step S28 and the step is sifted to determine whether the machine number is finished (step S29).

In the step of determining whether the machine number is finished, it is judged whether the machine number N in the use condition setting data obtained from the use condition setting file 11 (FIG. 2) is finished. If the machine number N is not finished, the variable M (machine number) is incremented by "+1" (M←M+1) (step S30) and the steps are repeated from the step of obtaining the next use condition setting data. If the machine number N is finished, then it is judged whether the usable candidate is present (step S31).

If any usable candidates are present, the machine number to be actually used is decided from the machine numbers of the usable candidates (step S32). As the method of decision, there are a method of equalizing the assigning number of the prescription data to the machine number and a method of assigning the prescription data to the appropriate machine number for the kind of the medicine in the prescription data and so on. To the decided machine number of the machine kind N, an operation command inherent to each machine kind is transmitted (step S33). For example, if the machine kind is the tablet packing machine, the command is a packing command, while if the machine kind is the medicine packing machine, the command is a printing command.

On the other hand, if no usable candidate is present, the prescription data is stored so as not to be erased (step S34). The stored prescription data is displayed again on the screen of "prescription data input" (FIG. 6). Thus, the error situation that there is no machine number which is possible to operate is displayed on the screen (FIG. 7) of use situation monitor (step S35).

As described above, when the process of"execution of dispensing machine operation" is finished, the operation of the dispensing machine 2 (machine kind=2, "medicine bag printing machine") is conducted at the step S6 in the "control of dispensing machine" (FIG. 5). In this process, by setting "2" (medicine bag printing machine) in the machine kind, the procedure of "execution of dispensing machine operation" (FIG. 9) is called and executed.

After that, it is judged whether the prescription data is finished (step S7). If the button of "CANCEL" is clicked on the screen of prescription data input (FIG. 6), the screen of prescription data input is finished, returning to the menu screen (illustration thereof is omitted). If the button of "CANCEL" is not clicked, the step is returned to step S2 to repeat the steps from the prescription data input.

In the case of adding an another machine kind, a pair of the step of judging whether the machine kind is operated and the step of setting the ID number of the machine kind to call the procedure of "execution of dispensing machine operation" are added. However, as the medicine bag printing machine is necessary to inevitably operate in any prescription data, the step of judging whether the machine kind is operated is not necessary.

As clear from the above description, the control apparatus for dispensing machines according to the present invention can easily deal with a plural kinds or a plural numbers of dispensing machines in the same manner. Namely, when applying the present invention to medical institutes which are multiply different in equipment condition of the dispensing machines, simplification of designing and manufacturing the control apparatus can be achieved and operation of dispensing machines is also unified and simplified. Moreover, the countermeasures to the error can be smoothly carried out.

Although the present invention has been fully described by way of the examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A control apparatus operable to control a plurality of dispensing machines in accordance with prescription data, said control apparatus comprising:

a hard disc unit operable to store a use condition setting file comprising a use condition of each dispensing machine said use condition includes prescription classification and a limitation on time zone; and a central processing unit operable to select a usable dispensing machine in accordance with both the prescription data and the use condition of each dispensing machine stored in the use condition setting file.

2. The control apparatus as in claim 1, wherein the use condition setting file stored in said hard disc unit includes a prescription classification showing any one of a prescription to outpatient, a prescription to inpatient and an undesignated prescription.

3. The control apparatus as in claim 1, further comprising:

a monitor screen, wherein said central processing unit is further operable to display the use situation of each dispensing machine on said monitor screen.

4. The control apparatus as in claim 1, further comprising:

a monitor screen, wherein said central processing unit is operable to judge whether there is no usable dispensing machine in accordance with the prescription data and the use condition setting file, and wherein said central processing unit, when judging that there is no usable dispensing machine in accordance with the prescription data and the use condition setting file, is further operable to temporarily store the prescription data and to display an error situation on said monitor screen.

5. The control apparatus as in claim 1, wherein said hard disc unit is further operable to store a serious error setting file comprising serious errors among errors which occur in the dispensing machines, the serious errors being possible to arbitrarily set, and wherein said central processing unit is further operable to judge whether an error sign inputted from any of the dispensing machines corresponds to any of the serious errors in the serious error setting file.

6. The control apparatus as in claim 5, further comprising:

a monitor screen, wherein said central processing unit is further operable to display the situation of one of the serious errors on said monitor screen if an error signal inputted from any of the dispensing machines corresponds to the one of the serious errors in the serious error setting file.

7. The control apparatus as in claim 5, further comprising:

a monitor screen, wherein said central processing unit is further operable to display the countermeasure of one of the serious errors on said monitor screen if an error signal inputted from any of the dispensing machines corresponds to the one of the serious errors in the serious error setting file.

8. The control apparatus as in claim 5, wherein said central processing unit is further operable to set the dispensing machine unusable and to stop assigning the prescription data to the dispensing machine if an error signal inputted from any of the dispensing machines corresponds to any of the serious errors in the serious error setting file.

9. The control apparatus as in claim 5, wherein said central processing unit is further operable to record the situation of one of the serious errors in a serious error recording file if an error signal inputted from any of the dispensing machines corresponds to the one of the serious errors in the serious error setting file.

* * * * *

UNITED STATES PATENT AND TRADEMARK OFFICE

CERTIFICATE OF CORRECTION

PATENT NO. : 6,580,968 B1
DATED : June 17, 2003
INVENTOR(S) : Hiroyuki Yuyama et al.

It is certified that error appears in the above-identified patent and that said Letters Patent is hereby corrected as shown below:

Column 4,
Line 63, please replace "(namely prescription" with -- (namely, prescription --.

Signed and Sealed this

Twenty-fourth Day of February, 2004

JON W. DUDAS
*Acting Director of the United States Patent and Trademark Office*